May 10, 1960     J. E. SIMON     2,935,896
REPLACEMENT VALVE HANDLE
Filed June 30, 1958

INVENTOR.
JOSEPH E. SIMON
BY

ATTORNEY.

United States Patent Office 2,935,896
Patented May 10, 1960

2,935,896
REPLACEMENT VALVE HANDLE

Joseph E. Simon, Melrose Park, Pa.

Application June 30, 1958, Serial No. 745,506

1 Claim. (Cl. 74—553)

This invention relates to a replacement handle for the valve stem of a faucet or the like.

The upper end of the valve stem of a faucet and the opening in the handle which is engaged thereby, are provided with complementary grooves and ribs, or other interengaging expedients, whereby the handle and the valve stem are integrated for joint rotation.

Sooner or later, the interengaging expedients on the valve stem, and/or on the handle, wear out so that the handle rotates freely on the valve stem.

One object of the invention is to produce an improved replacement valve stem handle of the type shown, for example, in the Stuvel Patent, No. 2,463,066 of March 4, 1949.

In order to fit valve stems of different manufacturers, a replacement handle has a relatively large opening for receiving the upper end of the valve stem and it is clamped on the end of the valve stem by means of set screws in the manner generally illustrated in the Stuvel patent aforesaid in which the handle has four arms, each of which is bored longitudinally to provide a tapped opening for receiving a set screw. Alternately, and as shown in Davidson Patent No. 2,607,616 of August 19, 1952, the replacement handle may have only one arm in which case a wedge is provided opposite the set screw for cutting into the valve stem under the pressure applied by the set screw.

In these and in other constructions of which I am aware, the set screw receiving opening extends clear through the handle arm and is readily visible, thus indicating that the handle is a replacement and is not original equipment. This handicaps the sale of replacement handles of this type.

The object of my invention is to produce a replacement valve handle which, when applied to the valve stem, will simulate the appearance of an original installation in the sense that, in the absence of deliberate and close examination from all sides, the tapped opening through which the set screw is inserted, will not be visible.

The full nature of the invention will be understood from the following specification and the accompanying drawing in which:

Fig. 2 is a vertical sectional view showing the manner in which the handle is applied to the valve stem of a spigot or the like.

Figure 1:
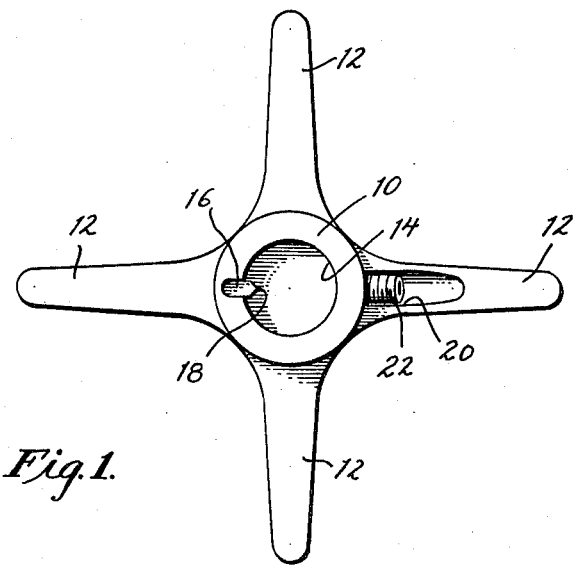
Fig. 1 is a bottom plan view of a handle embodying my invention.

In the drawings, there is illustrated a valve handle including a central hub 10 and four arms 12. On its underside hub 10 is provided with a vertical recess 14 and in the periphery of the opening is rigidly mounted a wedge 16 having an inner relatively sharp edge 18. Diametrically opposite wedge 16 I provide a tapped opening 20 through which the clamping set screw 22 is inserted and turned for engagement with the upper end of valve stem 24. When set screw 22 is tightened, it presses the valve stem against wedge 16 which cuts into the valve stem and co-acts with the opposite set screw to integrate the handle and valve stem for joint rotation. It will be noted that opening 20 is formed at an angle in the underside of arm 12 which is opposite wedge 16 so that it will not be visible to anyone viewing the handle from the top or from the side. In fact, opening 20 will be visible only if the handle is viewed from underneath.

Figure 2:
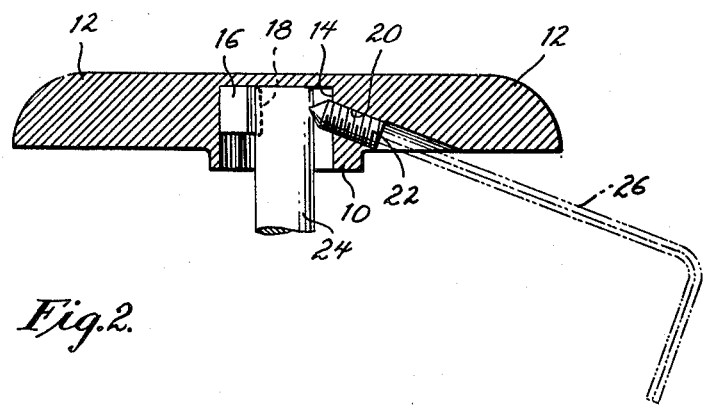

It will also be noted that the angle of set screw opening 20 is such that the outer end of the screw is readily engageable by screw driver 26, as shown in broken line in Fig. 2.

While the invention has been illustrated as applied to a four arm handle of the type shown in the Stuvel patent, it is obvious that it can be applied to a single arm handle of the type shown in the Davidson patent.

What I claim is:

A replacement valve handle including a hub having a recess in the underside thereof for receiving the end of a fixed valve stem, and at least one operating arm carried by and extending horizontally radially of said hub, there being a tapped opening formed in the underside of said arm in a surface thereof which extends normal to the axis of said stem for the passage of a set screw for clamping said handle on said valve stem, said opening extending longitudinally of said arm and having the end thereof adjacent said valve stem slightly higher than the other end thereof whereby said opening and said screw are invisible from the upper side and from the end of the arm and when said handle is in use.

References Cited in the file of this patent

UNITED STATES PATENTS

| | | |
|---|---|---|
| 2,305,099 | Morris | Dec. 15, 1942 |
| 2,463,066 | Stuvel | Mar. 1, 1949 |
| 2,607,616 | Davidson | Aug. 19, 1952 |

FOREIGN PATENTS

| | | |
|---|---|---|
| 1,065,832 | France | Jan. 13, 1954 |